United States Patent

[11] 3,545,700

[72] Inventor Daniel M. Klang
Huntington Station, New York
[21] Appl. No. 824,390
[22] Filed May 9, 1969
[45] Patented Dec. 8, 1970
[73] Assignee Potter Instrument Company, Inc.
Plainview, New York
a corporation of New York
Continuation of application Ser. No. 684,703, Nov. 21, 1968, now abandoned. This application May 9, 1969, Ser. No. 824,390

[54] REEL SERVO SYSTEM
6 Claims, 2 Drawing Figs.

[52] U.S. Cl. 242/184
[51] Int. Cl. G11b 15/58
[50] Field of Search 242/182, 183, 184, 185, 186, 188, 75.51; 226/49, 50, 51, 118, 119, 95, 97; 224/4, 11; 179/100.2; 318/6, 7

[56] References Cited
UNITED STATES PATENTS

| | | | |
|---|---|---|---|
| 3,236,429 | 2/1966 | Klein | 226/118X |
| 3,304,018 | 2/1967 | Kurth | 242/55.12 |
| 3,318,545 | 5/1967 | Tobey | 242/55.12 |

*Primary Examiner*—George F. Mautz
*Attorney*—Laurence J. Marhoefer

ABSTRACT: A reel servo for a tape transport employing short vacuum buffers in which the reel is energized to rotate in the reverse direction whenever both the reel and capstan are feeding tape into or withdrawing tape from the vacuum buffers.

INVENTOR
DANIEL M. KLANG

REEL SERVO SYSTEM

This U.S. Pat. application is a continuation of Ser. No. 684,703, filed Nov. 21, 1967, now abandoned.

BACKGROUND OF THE INVENTION

This invention relates to a magnetic tape transport and, more particularly, to a simple tape storage reel servosystem which reduces the size of the tape loop buffer required to transport tape at high speeds.

There are a number of generally satisfactory reel servocontrol systems known in the magnetic tape transport art. One such system is a so-called on-off system in which the reel motor is either energized to rotate at full speed in one direction or the other or is electrodynamically braked depending upon the length of tape in the buffer. Usually two photoelectric sensors are employed; one is positioned about one third of the vacuum column length from the top of the column, and the other about one third of the column length from the bottom. These sensors divide the vacuum column into three zones; an upper or payout zone, an intermediate or braking zone, and a lower or takeup zone. When the bight of the tape loop is below the lower sensor, the tape storage reel motor is energized to withdraw or takeup tape from the vacuum column. When the bight of the loop is above the upper sensor, the reel is driven to feed or payout tape into the vacuum column. And when the bight of the loop is between these two sensors, the reel motor is electrodynamically braked. Such a system is more fully described in the copending U.S. Pat. application of Frederick G. Moritz, Ser. No. 545,769, filed April 27, 1966, now U.S. Pat. No. 3,409,240 and assigned to the same assignee as this invention.

The above described system is advantageous in its simplicity and is quite satisfactory for many applications. However, for certain other applications where the vacuum columns must be as short as possible in order to make the transport compact, the response of an on-off servocontrol system is too slow to prevent the tape from pulling out of the vacuum columns or contacting the bottom of the column at high tape speeds.

The object of this invention is to provide an on-off reel servocontrol system which permits the use of relatively short vacuum columns at high tape speeds.

SUMMARY OF THE INVENTION

Briefly, this invention contemplates the provision of an on-off servosystem which is responsive to the direction of tape motion in addition to the length of the buffering loop.

In a preferred specific embodiment of the invention, two sensors divide each vacuum buffer into three sections as in prior art on-off servo systems. With the capstan at rest or with the capstan and reel moving tape in opposite directions, the servosystem operates in the manner of the prior art system described above. However, when the tape storage reel and capstan are both energized to either withdraw tape from or feed tape into the vacuum buffer, the polarity of signal energizing storage reel motor is reversed irrespective of the length of loop in the buffer, providing a strong braking torque on the motor.

DESCRIPTION OF THE DRAWINGS

Having briefly described this invention, it will be described in greater detail along with other objects and advantages in the following detailed description of a preferred embodiment which may be best understood by reference in the accompanying drawings. These drawings form part of the instant specification and are to be read in conjunction therewith. Like reference numerals are used to indicate like parts in the various views.

DESCRIPTION OF THE PREFERRED EMBODIMENTS

Figure 1:
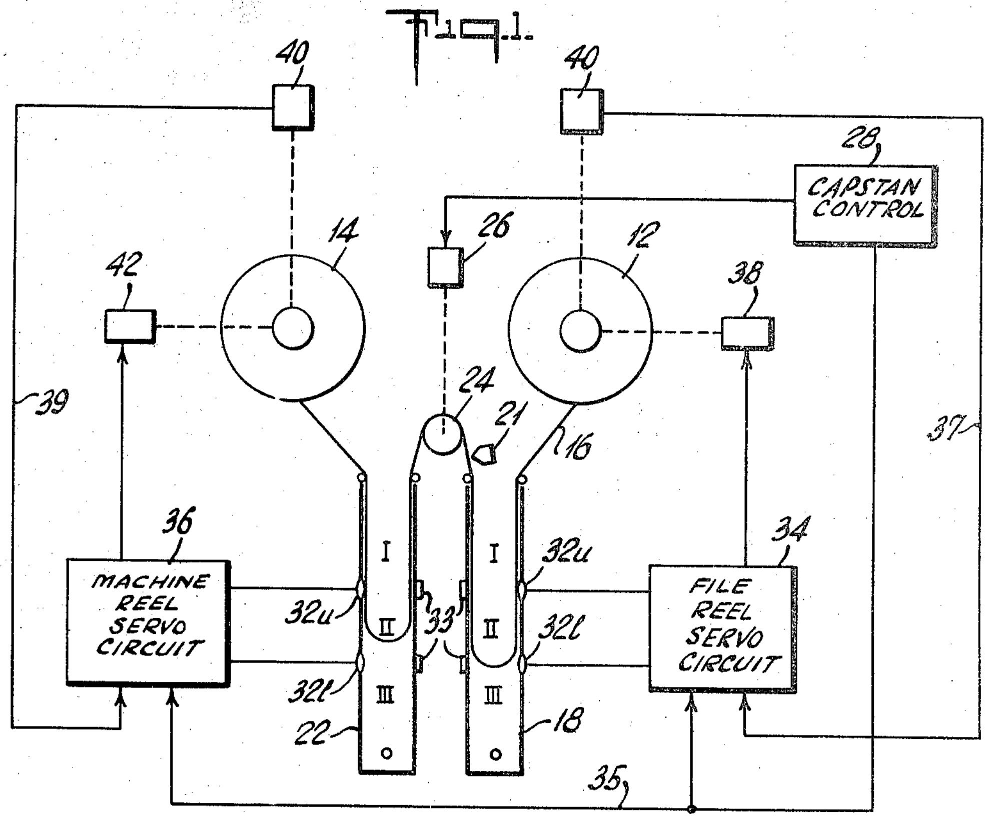
FIG. 1 is a block diagram of one embodiment of a tape transport constructed in accordance with the teachings of this invention.

Referring now to FIG. 1 of the drawings, a magnetic tape transport has a file reel 12 and a machine reel 14 rotatably mounted on a chassis, not shown. A tape 16 extends between the reels 12 and 14 and is formed into buffering loops in vacuum columns 18 and 22. A capstan 24 centrally disposed between the columns 18 and 22 drives the tape bidirectionally past a transducer 21 where information can be recorded on or read from the tape 16.

The capstan 24 is directly coupled to a DC motor 26. A capstan control circuit 28 energizes the motor in a manner well known to those skilled in the art to start the motor rotating in a counterclockwise or clockwise direction or to stop the motor, which in turn causes the tape to move in a forward direction or reverse direction or to stop.

Two photoelectric sensors 32 are mounted in the walls of each of the vacuum columns 18 and 22 and are illuminated by lamps 33. The sensors are further denoted by subscripts U and L to denote them as upper and lower sensors, respectively. These sensors divide each vacuum column into three zones; upper zone I, and intermediate zone II and a lower zone III.

The outputs of the sensors 32 in the file reel vacuum column 18 and the machine reel vacuum column 22 are coupled respectively to a file reel servocontrol circuit 34 and a machine reel servocontrol circuit 36. The outputs of servocontrol circuits 34 and 36, which are coupled respectively to a file reel motor 38 and a machine reel servomotor 42, energize these motors for rotation in a counterclockwise direction, or a clockwise direction or electrodynamically brake the motor depending upon the length of loop in the vacuum column.

In addition to being responsive to capstan position of the tape 16 in the buffer columns 18 and 22, the reel servosystem of this invention is additionally responsive to the direction of capstan rotation and storage reel rotation so that if the capstan and reel both are feeding or withdrawing tape from a vacuum column, the polarity of the power signal energizing the reel servomotor is reversed. To this end, a signal indicative of the direction of rotation of the capstan 24 is coupled to control circuits 34 and 36 via a line 35 and signals indicative of the direction of rotation reels 12 and 14 are coupled respectively to control circuits 34 and 36 via lines 37 and 39.

A suitable switch 40 coupled to the shafts of the reels 12 and 14, for example, may be used to determine the direction of reel rotation. Since the low inertia capstan responds very rapidly to an input signal, it is not necessary to actually sense its direction of rotation. An output from controller 28 is satisfactory for this purpose.

As will also be appreciated by those skilled in the art, when a tape reel rotating in one direction is suddenly energized for rotation in the opposite direction, it does not instantaneously respond. The initial effect of energizing the motor for rotation in the opposite direction is to strongly brake the motor.

Figure 2:
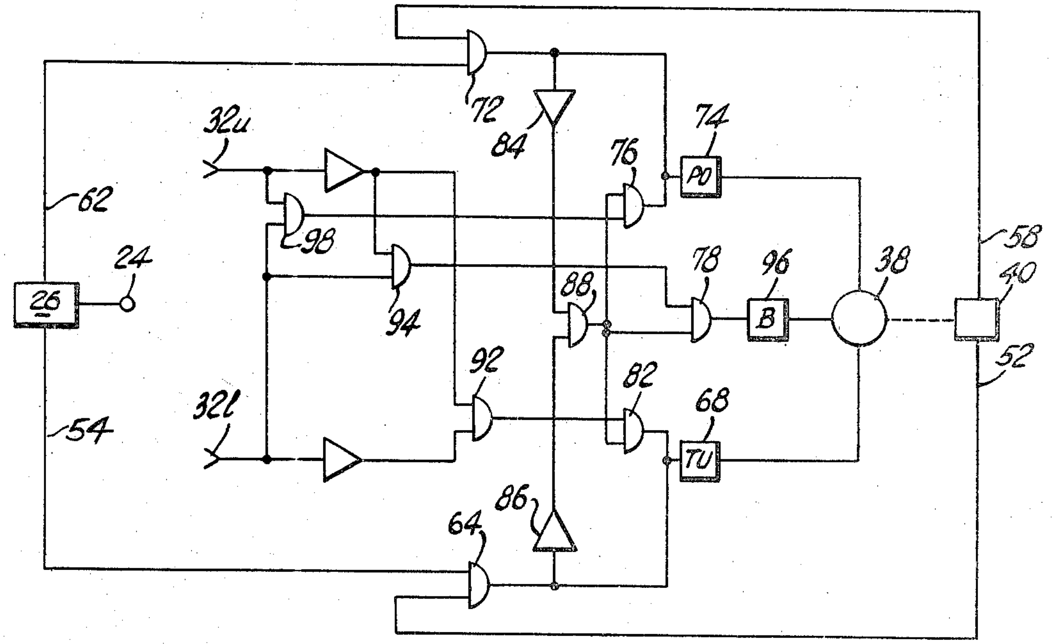
FIG. 2 is a logic diagram of an embodiment of a reel servosystem for the right-hand reel of FIG. 1.

The simplified logic diagram of FIG. 2 shows one embodiment of the control circuit for the file reel 12. The control circuit for the machine reel 14 is substantially the same, and it will not, therefore, be explained in detail. A positive potential level from sensor 40 on line 52 indicates clockwise rotation of the reel 12, for example, and a positive potential level from capstan control circuit 28 on line 54 indicates clockwise rotation of the capstan. Similarly, a positive level on line 58 indicates counterclockwise rotation of the reel 12, and a positive level on line 62 indicates counterclockwise rotation of the capstan 24.

With both the reel 12 and capstan 24 feeding tape into the buffer 18, and output from an AND gate 64 activates a power supply 68 of such a polarity as to cause the reel motor 38 to rotate in a counterclockwise direction. Similarly, with both the capstan 24 and reel 12 withdrawing tape from the buffer 18, and output from an AND gate 72 activates a power supply 74 which is of opposite polarity to power supply 68 and which, therefore, produces clockwise rotation of the motor 38. It should be noted that an output gate 72 or 64 is inverted by invertors 84 and 86 and coupled via AND gate 88 as enabling inputs to AND gates 76, 78 and 82, whose other inputs are coupled to sensors 32U and 32L. Therefore, an output from either gate 72 or 64 disenables gates 76, 78 and 82 and overrides the outputs of sensors 32U and 32L.

With the capstan and reel moving tape in opposite directions, the operation of the servosystem is the same as in the aforementioned Moritz application. Namely, with both sensors 32U and 32L covered, an output from AND gate 92 activates the power supply 68 to withdraw tape from the vacuum column. With the upper sensor 32U covered and the lower sensor 32L exposed, and output from AND gate 94 activates a circuit 96 which couples a resistor across the armature of the motor to electrodynamically brake the motor. With both sensors exposed, an output from AND gate 98 activates power supply 74 to feed tape into the buffer.

In operation, if the reel 12 and the capstan 24 are both feeding tape into the vacuum column 18 or both withdrawing tape therefrom, the reel servomotor 38 is energized for rotation in the opposite direction. The initial effect of this is to apply a strong brake force to the reel 12, which prevents the tape from being either completely withdrawn from the vacuum column or from hitting the bottom. With the reel 12 and capstan moving the tape in opposite directions, the sensors 32U and 32L control the reel servomotor 38 in the manner previously explained.

I claim:

1. A reel motor servocontrol system for a magnetic tape transport employing tape loop forming vacuum column buffers comprising, in combination:

a capstan for feeding tape past a transducer;

first means responsive to the direction in which tape is fed by the capstan;

a reel for feeding tape in a paying-out mode and a taking-up mode;

second means responsive to the direction in which said reel is feeding tape; and third means responsive to said first and said second means for energizing said reel motor from potential source of a polarity that tends to reverse the rotation of said reel motor when said capstan and said reel both are feeding tape into said column or both withdrawing tape from said vacuum column.

2. A reel motor servocontrol system as in claim one further including fourth means operative when said capstan and said reel are not both feeding tape into or withdrawing tape from said vacuum column, said fourth means energizing said reel servomotor to feed tape into said vacuum column when the bight of the tape loop rises above a first predetermined point in said vacuum column and to withdraw tape from said vacuum column when the bight of the tape loop drops below a second predetermined point in said vacuum column.

3. A reel motor servocontrol system as in claim 2 wherein said first and second points are spaced apart a predetermined distance and said fourth means further electrodynamically brakes said reel motor when the bight of the tape loop is between said first and second predetermined points.

4. A reel motor servocontrol system as in claim one further including fourth means operative when said capstan and said reel are not both feeding tape into or withdrawing tape from said vacuum column, said fourth means energizing said reel servomotor to feed tape into said vacuum column or to withdraw tape from said vacuum column as a function of the depth of penetration of the tape loop into said vacuum column.

5. A reel motor servocontrol system for a magnetic tape transport employing a tape loop buffer comprising, in combination:

a capstan for feeding tape past a transducer, first means responsive to the direction in which tape is fed by the capstan;

a reel for feeding tape in a paying-out mode and a taking-up mode;

second means responsive to the direction in which said reel is feeding tape; and third means responsive to said first and said second means for braking the reel motor when said capstan and said reel both are feeding tape to increase the size or reduce the size of the buffering tape loop.

6. A reel motor servocontrol system as in claim five wherein said third means for braking said reel motor includes means for energizing said reel motor from a potential source of a polarity that tends to reverse the rotation of said reel motor.